UNITED STATES PATENT OFFICE.

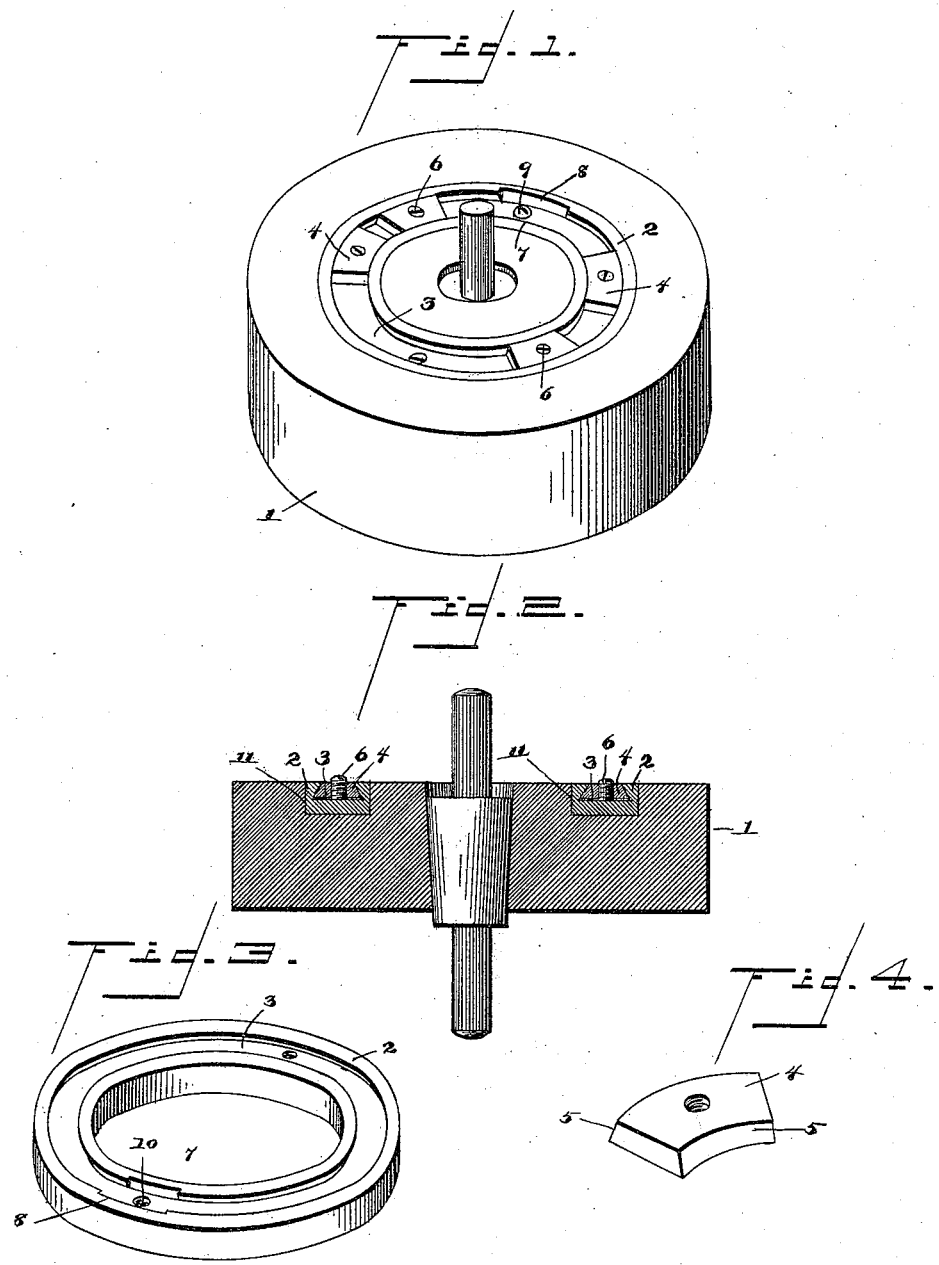

DANIEL B. COOK, OF NORWICH, NEW YORK.

BALANCING DEVICE FOR WHEELS.

SPECIFICATION forming part of Letters Patent No. 430,270, dated June 17, 1890.

Application filed February 11, 1890. Serial No. 340,014. (No model.)

*To all whom it may concern:*

Be it known that I, DANIEL B. COOK, a citizen of the United States, residing at Norwich, in the county of Chenango and State of New York, have invented new and useful Balancing Devices for Wheels, Pulleys, and the like, of which the following is a specification.

The invention relates to improvements in balancing devices for wheels, pulleys, and the like.

The object of the present invention is to provide a simple, strong, and durable device for balancing wheels, pulleys, and the like, and especially polishing-wheels, where great accuracy is required, which device will be adapted to be readily applied to a wheel without injuring or anywise interfering with the same, and which will be capable of maintaining the wheel in perfect balance.

The invention consists in the construction and novel combination and arrangement of parts hereinafter fully described, illustrated in the accompanying drawings, and pointed out in the claim hereto appended.

In the drawings, Figure 1 is a perspective view of a wheel provided with a balancing device constructed in accordance with this invention. Fig. 2 is a transverse sectional view. Fig. 3 is a detail view of the grooved ring. Fig. 4 is a similar view of one of the weights.

Referring to the accompanying drawings, 1 designates a wheel, which has let in one of its side faces a ring 2, that is provided with a circular dovetailed groove 3, in which is arranged a series of weights 4, that are adapted to be adjusted in said groove to various positions on the face of the wheel, and thereby enable the latter to be perfectly balanced. The weights 4 are slightly curved and have their edges 5 inclined and fitting snugly in the sides of the dovetailed groove and are adapted to be moved around in said groove, and are securely retained in any desired position by set-screws 6, that engage the bottom of the groove. The adjustable weights, which slide in the dovetailed groove of the ring 2, are securely held in place by the sides of the groove, and are prevented being accidentally thrown out during the rotation of the wheel, and in order to allow them to be inserted in the groove the ring is provided with notches 7 and 8, which are sufficiently long to allow the curved weights 4 to be readily placed in the groove, and in order to lock the weights in the groove and prevent them aligning with the notches a headed screw 9 is employed, which passes through a perforation 10 in the bottom of the groove opposite the notches 7 and 8 and intermediate the ends thereof. The screw 9 also serves to secure the ring in the recess 11 of the wheel 1, and the said ring is secured to the wheel at other points by flat-headed screws, which are countersunk in the bottom of the plate and do not project above the same like the screw 9, which extends upward a sufficient distance from the bottom of the groove to be readily engaged by a sliding weight.

It will readily be seen that the device for balancing wheels is strong and durable and comparatively inexpensive in construction, and is adapted to be readily secured to wheels and pulleys of all descriptions, and are capable of perfectly balancing the same and of maintaining them securely in that condition without liability of their becoming unbalanced.

What I claim is—

A balancing device for wheels, pulleys, and the like, comprising the ring having the dovetailed groove, and provided with oppositely-disposed notches 7 and 8, forming a weight-entrance to the groove, the curved weights having beveled edges adapted to engage the dovetailed groove, the set-screws arranged to engage the bottom of the groove and secure the weights at any desirable position, and the screw 9, arranged opposite the notches 7 and 8, and provided with a projecting head adapted to be engaged by the weights to prevent the same sliding opposite the notches 7 and 8, substantially as described.

In testimony that I claim the foregoing as my own I have hereto affixed my signature in presence of two witnesses.

DANIEL B. COOK.

Witnesses:
CHAS. A. HOUGHTON,
ROBT. H. PHELPS.